United States Patent [19]

Hwang et al.

[11] Patent Number: 4,926,342

[45] Date of Patent: May 15, 1990

[54] HIGH PRESSURE ROTOR STRESS DAMAGE ACCUMULATING METHOD

[75] Inventors: Edward Y. Hwang, Winter Park; Michael P. Chow, Orlando, both of Fla.

[73] Assignee: Westinghouse Electric Corp., Pittsburgh, Pa.

[21] Appl. No.: 140,064

[22] Filed: Dec. 31, 1987

[51] Int. Cl.[5] .......................... G01M 7/00; G01N 3/60

[52] U.S. Cl. ................................ 364/508; 364/571.07; 340/665; 374/46; 374/57; 73/766; 73/789

[58] Field of Search .................... 364/507, 508, 571.07; 73/766, 789; 340/665, 683; 374/4, 5, 46, 55–57

[56] References Cited

U.S. PATENT DOCUMENTS

| | | | |
|---|---|---|---|
| 4,184,205 | 1/1980 | Morrow | 364/508 |
| 4,722,062 | 1/1988 | Brettropf et al. | 364/508 |
| 4,764,882 | 8/1988 | Braschel et al. | 364/508 |
| 4,787,053 | 11/1988 | Moore | 364/507 |

OTHER PUBLICATIONS

Berry et al., "Prevention of Cyclic Thermal-Stress Cracking in Steam Turbine Rotors," Paper No. 63-P-WR-16, American Society of Mechanical Engineers, Jul. 1964.

*Primary Examiner*—Parshotam S. Lall
*Assistant Examiner*—Brian M. Mattson

[57] ABSTRACT

A method for accumulating stress damage induced by temperature differentials in a rotor of a high pressure steam turbine utilizes a representation of stress damage corresponding to a period of continuous temperature change. A counter variable associated with the representation of stress damage is incremented each time there is a significant change in direction of change in stress induced in the rotor. Accumulated stress damage is calculated by summing the products of each counter variable times a coefficient of stress damage corresponding to that counter variable. Accumulated stress damage is added to previously accumulated stress damage, calculated prior to resetting of the counter variables, to produce total accumulated stress damage. The total accumulated stress damage is printed on a permanent storage medium, such as paper, and it is compared with an alarm setpoint. If the alarm setpoint is exceeded, a message is sent to the operator and the operation of the steam turbine may also be adjusted.

13 Claims, 3 Drawing Sheets

HIGH PRESSURE ROTOR STRESS DAMAGE ACCUMULATING METHOD

BACKGROUND OF THE INVENTION

1. Field of the Invention

The present invention is related to a method for keeping track of accumulated stress damage and, more particularly, to a method for accumulating stress damage caused by surface effect temperature differentials in the rotor of a high pressure steam turbine.

2. Description of the Related Art

As is well known, when an object is heated or cooled unevenly, stress can be formed due to the expansion or contraction of part of the object relative to another part of the object which is fixed in place. The stress induced by such temperature differential can be calculated by known techniques, as described in ASME Paper No. 63-PWR-16, "Prevention of Cyclic Thermal-Stress Cracking in Steam Turbine Rotors," by W. R. Berry, published by the American Society of Mechanical Engineers in 1964. Steam turbines are commonly monitored to detect the operating temperature so that surface effect temperature differentials which induce stress in the rotor of the turbine can be calculated. The resulting information is used, for among other purposes, to estimate stress damage to the rotor 8, illustrated in FIG. 3, by temperature changes during the operation of the turbine.

The estimated stress damage may be accumulated by incrementing a mechanical counter by an amount corresponding to the amount of stress damage induced during a single period of substantially continuous heating or cooling. Recently, non-volatile storage devices have been used in place of mechanical counters. However, regardless of whether the storage device is a mechanical counter or a non-volatile storage device, the accumulated stress damage counter may fail. For this reason, duplicate counters or storage devices are usually provided for redundancy. However, when considering that the life of a turbine is typically 30 years, even double or triple redundancy may be insufficient and each extra device increases the cost. If, despite such precautions, the devices fail, the failure may go unnoticed, and in the case of non-volatile counters, the accumulated stress damage prior to failure may be completely lost.

SUMMARY OF THE INVENTION

An object of the present invention is to provide a method for accumulating stress damage which does not require a mechanical counter or an electronic storage device to permanently store accumulated stress damage.

Another object of the present invention is to provide a method for accumulating stress damage via a computer program which is easily restarted even if all power is lost by the computer executing the program.

A further object of the present invention is to provide a method of accumulating stress damage which includes generation of an alarm message when the accumulated stress damage exceeds a previously determined amount.

The above objects are attained by providing a method for accumulating stress damage induced by temperature changes comprising execution of the following steps in a computing apparatus: determining stress induced between the beginning and end of a period of substantially continuous temperature change in one direction; incrementing one of a plurality of counter variables, the one counter variable corresponding to a stress range including the stress just determined; calculating accumulated stress damage by summing each of the plurality of counter variables multiplied by a coefficient of stress damage represented by the counter variable corresponding thereto; and repeating the above steps of determining, incrementing and calculating for subsequent periods of substantially continuous temperature change in one direction. Preferably, the counter variable is incremented by performing a table look-up to convert the stress determined in the first step into a counter index and incrementing the counter variable corresponding to the counter index.

The method is made restartable by including a step of adding a previously accumulated stress damage to the just calculated accumulated stress damage to produce a total accumulated stress damage. The total accumulated stress damage is preferably output onto permanent storage media such as paper. Preferably, the total accumulated stress damage is compared with an alarm setpoint, and an alarm message is output if the total accumulated stress damage exceeds the alarm setpoint. When the method is used to accumulate stress damage in a rotor of a high pressure steam turbine, automatic control of the turbine may be modified when the alarm setpoint is exceeded.

DESCRIPTION OF THE PREFERRED EMBODIMENT

Figure 1:
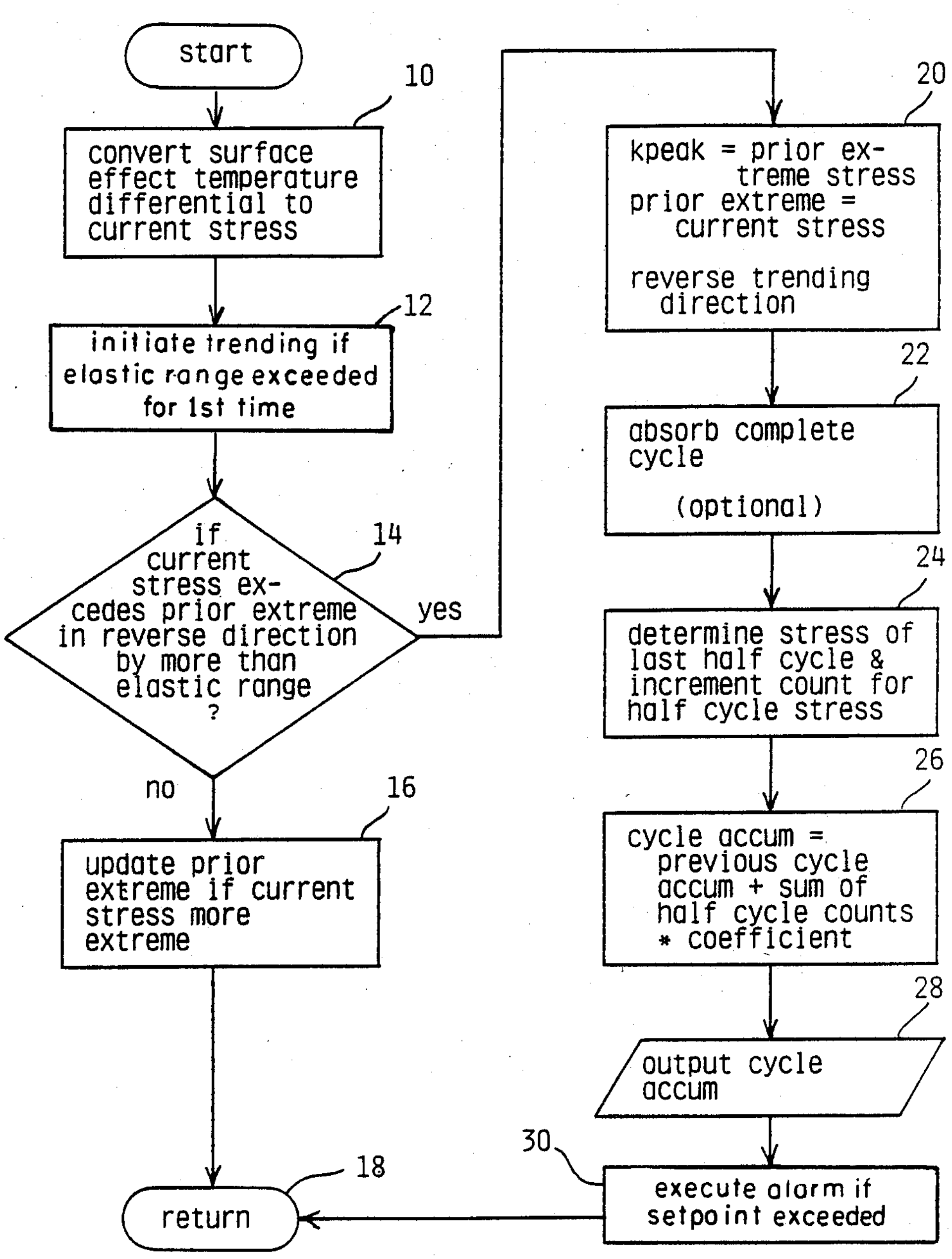
FIG. 1 is a flowchart of a method according to the present invention.

A general overview of the method is provided by the flowchart in FIG. 1. In step 10, conventional methods are used to detect temperature in a steam turbine 11 and to convert the detected temperature to stress in units of $10^3$ lbs/square inch (KSI) stress. A variable indicating whether the following steps have been executed previously is checked in step 12. If the program is being entered for the first time, the current stress is compared with an elastic range to determine whether a significant amount of stress has been induced. If an insignificant amount of stress has been induced, the rest of the program is not executed. If a significant amount of stress has been induced, a variable is set to indicate whether the stress is increasing or decreasing, and processing continues with step 14 as in the case of trending having been initiated previously.

In step 14, the current stress is compared with a prior extreme stress value. If the current stress is continuing to change in the same direction or is within the elastic range of the prior extreme stress, the program executes step 16. If the current stress is more extreme than the prior extreme stress, the prior extreme stress is set equal to the current stress value. The program then returns and waits for the next stress value to be calculated.

If, at step 14, the current stress exceeds the prior extreme stress in the reverse direction by more than the elastic range, processing shifts to step 20. In step 20, the prior extreme stress value is assigned to a variable (KPEAK) and is reset to the most recently measured stress value. In addition, a variable is set indicating that the direction of change in stress is the reverse of that previously. Complete cycles may be absorbed in step 22. Since this step is optional, it will be described in more detail below with reference to FIG. 2.

Regardless of whether the completed cycles are absorbed, in step 24 a representation of stress damage induced between the beginning and the end of the period of substantially continuous temperature change in one direction is determined, and then one of a plurality of counter variables is incremented. The steps for performing this procedure are illustrated in more detail in FIG. 2. After the representation of stress damage induced during the most recent half cycle has been determined in step 24, total accumulated stress damage is calculated in step 26 by adding a previously accumulated stress damage to the sum of the half cycle counter variable times a coefficient corresponding to the stress damage represented by that counter variable. The resulting total accumulated stress damage is output in step 28 onto permanent storage medium, such as paper 29 using a printer 27 (FIG. 3), and is compared with an alarm setpoint in step 30. If the total accumulated stress damage exceeds the alarm setpoint, a message is output to the operator of the steam turbine and, if desired, the automatic control system 31 of the steam turbine can be instructed to modify its control of the steam turbine, for example to reduce fluctuations in temperature.

Figure 2:
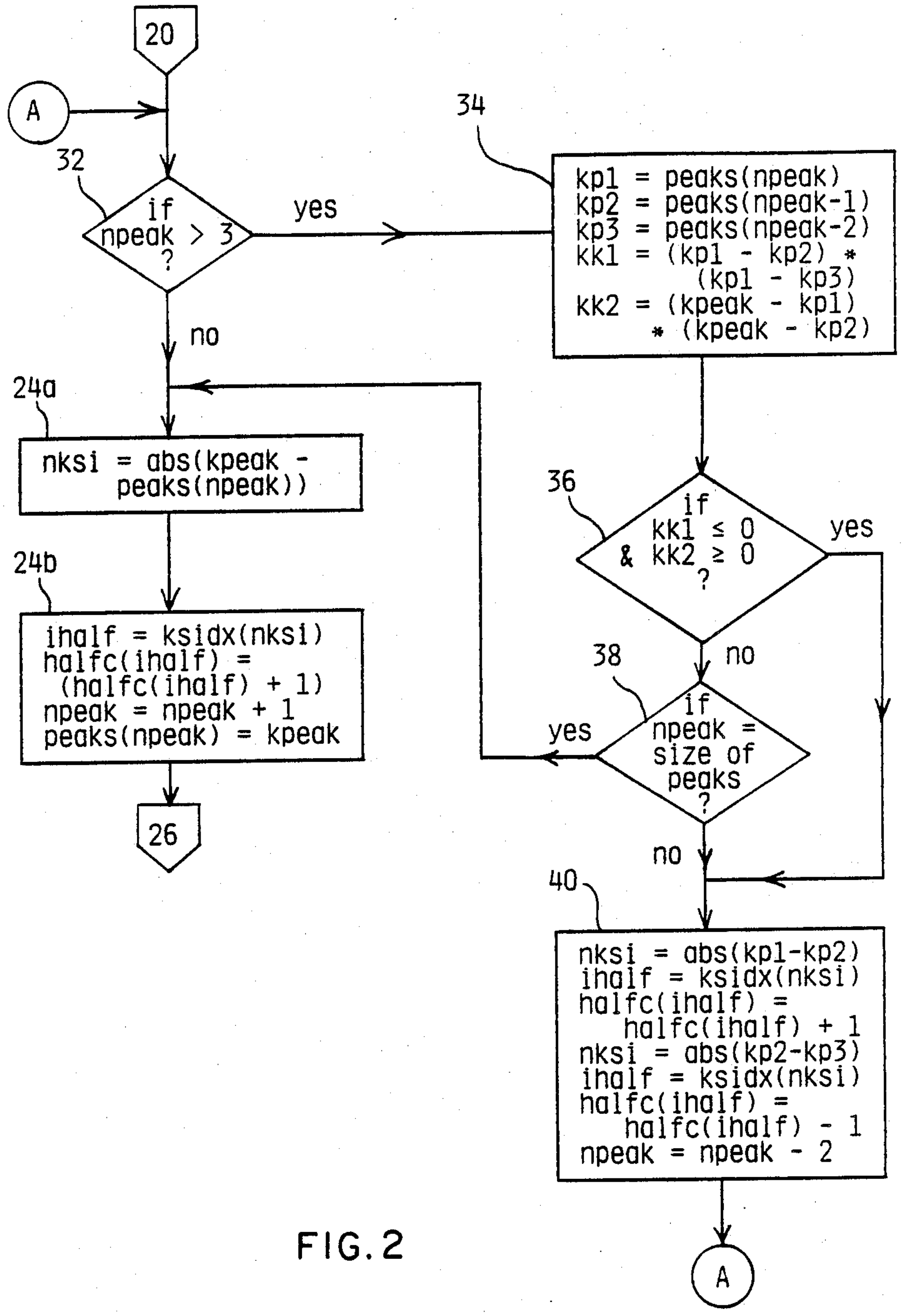
FIG. 2 is a more detailed flowchart of steps preferably used to determine the stress damage between two extreme values and for absorbing complete cycles in the recorded data.
Figure 3:
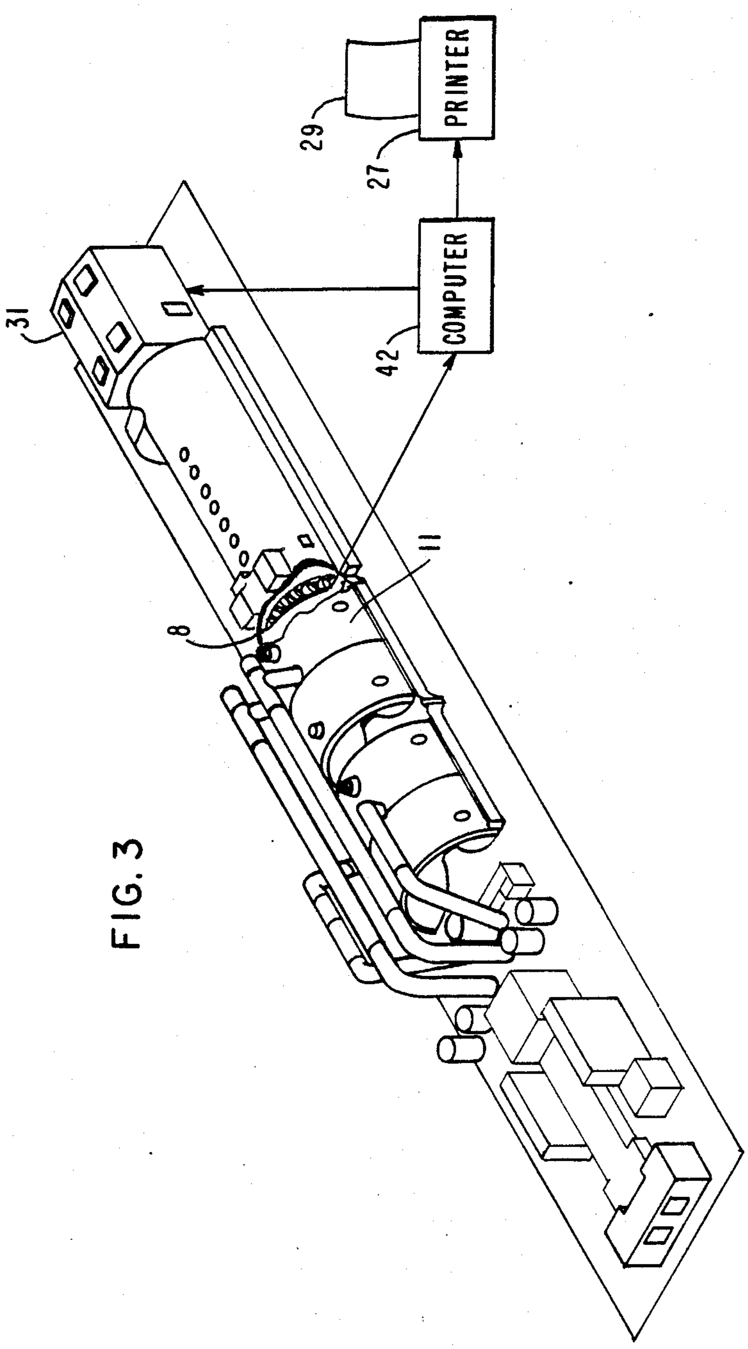
FIG. 3 is apparatus used to carry out the method of the invention.

The comparison in step 32 of FIG. 2 is only included if it is desired to include step 22 to absorb complete cycles of stored data. If step 32 is not included or there are three or fewer peaks, then step 24*a* is executed. Step 24*a* in FIG. 2 illustrates one way of determining the representation of stress damage induced between a most recent change in direction of the current stress and an immediately previously stored extreme stress value. The variable NKSI is assigned the absolute value of the difference between the stress (KPEAK) induced between the most recent change of direction in current stress and an immediately previously stored extreme stress value which is stored in element NPEAK of the array PEAKS. Then, in step 24*b* function KSIDX is used to convert the half cycle stress NKSI to an index IHALF of an array HLFC. This results in an index corresponding to a stress range including the half cycle stress NKSI. The element of the counter variable array HLFC identified by the index IHLF is next incremented by one. Finally, the index NPEAK of the array (PEAKS) of peak values is incremented, and the most recent extreme stress value (KPEAK) is assigned to the element of PEAKS identified by NPEAK.

As is readily apparent, as the temperature of the steam turbine fluctuates due to varying demand, the value of NPEAK will increase over a long period of time, and the value of NPEAK will become unacceptably large. There are several ways of handling this problem. One is to periodically clear the array PEAKS and reset the value of NPEAK. A preferable method of avoiding large values of NPEAK and correspondingly large numbers of elements in PEAKS is illustrated in FIG. 2.

If the value of NPEAK is less than three at step 32, there are an insufficient number of extreme stress values to check for a complete cycle, and therefore, processing proceeds directly with step 24*a*. If there are more than three extreme values stored in the array PEAKS, processing proceeds with step 34. In step 34, temporary variables KP1, KP2, KP3, KK1 and KK2 are set to the values indicated. The variables KPn, where n equals 1, 2 or 3, respectively contain the previously detected extreme stress values stored one, two and three changes in direction previously. The variables KK1 and KK2 provide an indication of how KP1 and KP2 compare to KP3 and KPEAK.

In step 36, the values of KK1 and KK2 are checked to determine whether a cycle lies between a most recent change in direction of change in current stress and a previously detected extreme stress value stored three changes in direction previously. If there is no cycle loop, the index NPEAK is compared with the size of the array PEAKS. If PEAKS is not full, the process continues with step 24*a*. On the other hand, if a complete cycle is detected or the array PEAKS is full, processing proceeds with step 40 to cancel the previously detected extreme stress values in the cycle loop before performing the calculations in steps 24*a* and 24*b*.

In step 40, the variable NKSI is assigned the stress induced between previously detected extreme stress values stored one and two changes in directions previously. Then, NKSI is used to find the index (IHALF) of the counter variable array (HALFC) which is then incremented. The variable NKSI is set to the stress induced between the previously detected extreme stress values stored two and three changes in direction previously, the index of HALFC representing the stress range containing NKSI is calculated, and the element of HALFC identified by IHALF is decremented by one. Finally, the next available element index (NPEAK) of the array PEAKS is decremented by two.

After step 40, processing returns to the decision step 32 so that the array PEAKS can be checked for additional complete cycles. Assuming that no further complete cycles are found, the previously detected extreme stress value stored three changes in direction previously will be used in step 24*a* as the immediately previously stored extreme stress value, because NPEAK has been decremented by two in step 40. The processing in step 40 results in modification of the counter variables in the array HALFC to include the cycle loop detected by steps 34 and 36, but exclude the stress corresponding to the period of substantially continuous temperature change preceding the cycle loop. The stress damage corresponding to this period of substantially continuous temperature change will be included when NKSI is calculated in step 24*a* between the most recent extreme stress value (KPEAK) and the previously detected extreme stress value stored three changes in direction previously which will be in PEAKS(NPEAK), because NPEAK was decremented by two in step 40.

The function KSIDX performs a table look-up to convert the variable NKSI determined for the most recent substantially continuous temperature change in one direction (or an equivalent period which includes a complete cycle) into the counter index IHALF which represents the number of occurrences of a specific amount of estimated stress damage during a period of substantially continuous temperature change in one direction. By using this index to identify an element in an array (HALFC) of counter variables, a reasonably accurate representation of stress damage can be stored very efficiently. Thus, step 26 comprises summing the product of each of the array elements in HALFC times a coefficient of the stress damage represented by the element of HALFC corresponding thereto. This accumulated stress damage is then added in step 26 to a previous accumulated stress damage to produce a total accumulated stress damage (CYCLE ACCUM). By outputting the total accumulated stress damage onto permanent storage media such as paper 29 at step 28, there need be no concern with the loss of power in a computing apparatus 42 programmed according to the present invention. The operator need merely read the most recently printed total accumulated stress damage and store it as the previous accumulated stress damage after power is restored.

The many features and advantages of the present invention are apparent from the detailed specification, and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method for accumulating stress damage induced by temperature change, comprising execution of the following steps in a computing apparatus:

(a) determining a representation of stress damage induced between beginning and end of a period of substantially continuous temperature change in one direction, including the substeps of (ai) converting temperature differential to current stress;

(aii) detecting a most recent change, exceeding an elastic range, in direction of change in current stress;

(aiii) storing, as an extreme stress value, the most recent change detected in step (aii), together with previously detected extreme stress values, each corresponding to previous changes in direction of change in stress; and (aiv) determining the representation of stress damage induced between the most recent change in direction of change in current stress detected in step (aii) and an immediately previously stored extreme stress value;

(b) incrementing one of a plurality of counter variables, the one counter variable corresponding to a range including the representation of stress damage determined in step (a);

(c) calculating accumulated stress damage by summing each of the plurality of counter variables multiplied by a coefficient of stress damage represented by the counter variable corresponding thereto; and (d) repeating steps (a)-(c) for subsequent periods of substantially continuous temperature change in one direction.

2. The method as recited in claim 1, wherein step (b) comprises the steps of:

(bi) performing a table lookup to convert the representation of stress damage determined in step (a) into a counter index;

(bii) incrementing the one counter variable corresponding to the counter index.

3. The method as recited in claim 2, wherein step (a) further comprises the following steps performed before step (aiv):

(av) checking for a cycle loop between the most recent change in direction of change in current stress and the previously detected extreme stress value, stored three changes in direction previously;

(avi) cancelling the previously detected extreme stress values in the cycle loop if detected in step (av), whereby the previously detected extreme stress value, stored three changes in direction previously, will be used as the immediately previously stored extreme stress value in step (aiv); and (avii) modifying the counter variables to include the cycle loop detected in step (av), while excluding stress induced by the period of substantially continuous temperature change preceding the cycle loop.

4. The method as recited in claim 3, wherein the previously detected extreme stress values are stored in an array, wherein step (avi) comprises the step of decrementing by two a next available element index of the array, and wherein step (avii) comprises the steps of:

(avii1) decrementing the counter variable corresponding to a first half cycle between the previously detected extreme stress values stored two and three changes in direction previously; and (avii2) incrementing the counter variable corresponding to a second half cycle between the previously detected extreme stress values stored one and two changes in direction previously.

5. The method as recited in claim 5, further comprising the step of (e) adding a previously accumulated stress damage to the accumulated stress damage calculated in step (c) to produce a total accumulated stress damage.

6. The method as recited in claim 5, further comprising the step of (f) outputting the total accumulated stress damage onto permanent storage media.

7. The method as recited in claim 6, wherein step (f) comprises printing the total accumulated stress damage on paper.

8. The method as recited in claim 5, further comprising the steps of:

(f) comparing the total accumulated stress damage with an alarm setpoint; and (g) outputting an alarm message when said comparing in step (f) indicates the total accumulated stress damage exceeds the alarm setpoint.

9. The method as recited in claim 8, wherein said method accumulates stress damage in a rotor of a high pressure steam turbine, and wherein said method further comprises the step of (h) modifying automatic control of the high pressure stream turbine when the alarm setpoint is exceeded.

10. A method for accumulating stress damage induced by temperature change of a rotor in a high pressure steam turbine, an automatic control system performing automatic control of the high pressure steam turbine, said method comprising execution of the following steps in a computing apparatus:

(a) converting surface effect temperature differential to current stress;

(b) detecting a most recent change, exceeding an elastic range, in direction of change in current stress;

(c) storing an extreme value of the current stress detected in step (b), together with previously detected extreme stress values, each corresponding to previous changes in direction of change in stress;

(d) determining a representation of stress damage induced between the most recent change in direction of the current stress detected in step (b) and an immediately previously stored extreme stress value;

(e) performing a table lookup to convert the representation of stress damage determined in step (d) into a counter index corresponding to a range including the representation of stress damage determined in step (d);

(f) incrementing one of a plurality of counter variables selected in dependance upon the counter index;

(g) calculating accumulated stress damage by summing each of the plurality of counter variables multiplied by a coefficient of stress damage represented by the counter variable corresponding thereto;

(h) adding a previously accumulated stress damage to the accumulated stress damage calculated in step (g) to produce a total accumulated stress damage;

(i) printing the total accumulated stress damage on paper;

(j) outputting an alarm message when the total accumulated stress damage exceeds an alarm setpoint; and (k) repeating steps (a)-(j) for each subsequent period of substantially continuous temperature change in one direction.

11. The method as recited in claim 10, further comprising the following steps performed before step (d):

(c1) checking for a cycle loop between the most recent change in direction of change in current stress and the previously detected extreme stress value, stored three changes in direction previously;

(c2) cancelling the previously detected extreme stress values in the cycle loop if detected in step (1), whereby the previously detected extreme stress value stored three changes in direction will be used as the immediately previously stored extreme stress value in step (d); and (c3) modifying the counters to include the cycle loop if detected in step (b 1), while excluding stress in the period of substantially continuous temperature change preceding the cycle loop.

12. The method as recited in claim 11, wherein the previously detected extreme stress values are stored in an array and step (m) comprises decrementing by two a next available element index of the array, and wherein step (n) comprises the steps of:

(n1) decrementing the counter variable corresponding to a first half cycle between previously detected stress values stored two and three changes in direction previously; and (n2) incrementing the counter variable corresponding to a second half cycle between the previously detected stress values stored one and two changes in direction previously.

13. The method as recited in claim 10, further comprising the step of (1) modifying the automatic control of the high pressure steam turbine when the alarm setpoint is exceeded.

* * * * *